US007817786B2

(12) United States Patent
Lee et al.

(10) Patent No.: US 7,817,786 B2
(45) Date of Patent: *Oct. 19, 2010

(54) METHOD AND SYSTEM OF AUTOMATICALLY PAUSING AN AUTOMATED VOICE SESSION

(75) Inventors: David C. Lee, Sunnyvale, CA (US); Johnny H. Lee, San Gabriel, CA (US); Fadi R. Jabbour, Sunnyvale, CA (US); Bradley R DeGrazia, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1113 days.

This patent is subject to a terminal disclaimer.

(21) Appl. No.: 11/283,444

(22) Filed: Nov. 18, 2005

(65) Prior Publication Data

US 2006/0126804 A1    Jun. 15, 2006

Related U.S. Application Data

(63) Continuation-in-part of application No. 11/013,222, filed on Dec. 14, 2004, now Pat. No. 7,471,774.

(51) Int. Cl.
*H04M 1/64* (2006.01)
(52) U.S. Cl. .................. 379/88.23; 379/76; 379/142.05
(58) Field of Classification Search .............. 379/88.25, 379/88.23, 88.17, 88.16, 71, 76, 67.1, 142.04, 379/142.05

See application file for complete search history.

(56) References Cited

U.S. PATENT DOCUMENTS

| 4,326,298 | A | 4/1982 | Fromm et al. | 455/606 |
|---|---|---|---|---|
| 4,875,230 | A | 10/1989 | Blair | 379/63 |
| 4,945,570 | A | 7/1990 | Gerson et al. | 381/110 |
| 5,664,007 | A | 9/1997 | Samadi et al. | 455/442 |
| 5,724,420 | A | 3/1998 | Torgrim | 379/372 |
| 6,016,336 | A * | 1/2000 | Hanson | 379/88.23 |
| 6,614,769 | B1 | 9/2003 | Erlick et al. | 370/331 |
| 6,625,261 | B2 * | 9/2003 | Holtzberg | 379/88.23 |
| 6,654,447 | B1 * | 11/2003 | Dewan | 379/76 |
| 6,865,159 | B2 | 3/2005 | Weaver | 370/250 |
| 2002/0187788 | A1 | 12/2002 | McKay | 455/450 |
| 2003/0063578 | A1 | 4/2003 | Weaver | 370/289 |
| 2004/0235509 | A1 * | 11/2004 | Burritt et al. | 455/519 |

OTHER PUBLICATIONS

PCT Notification of Transmittal of the International Search Report and the Written Opinion of the International Searching Authority, or the Declaration; Int'l application No. PCT/US06/40915; 11 pages, Apr 27, 2007.

* cited by examiner

*Primary Examiner*—Olisa Anwah
(74) *Attorney, Agent, or Firm*—Baker Botts L.L.P.

(57) ABSTRACT

A method for providing communication with an automated voice system includes establishing a first communication session between a caller and the automated voice system. The first communication session includes a call thread. The method also includes receiving a signal indicative of a call event. In response to receiving the signal indicative of the call event, a state of the call thread is saved. The method also includes establishing a second communication session between the caller and the automated voice system at a state of the call thread associated with the saved state of the call thread.

29 Claims, 2 Drawing Sheets

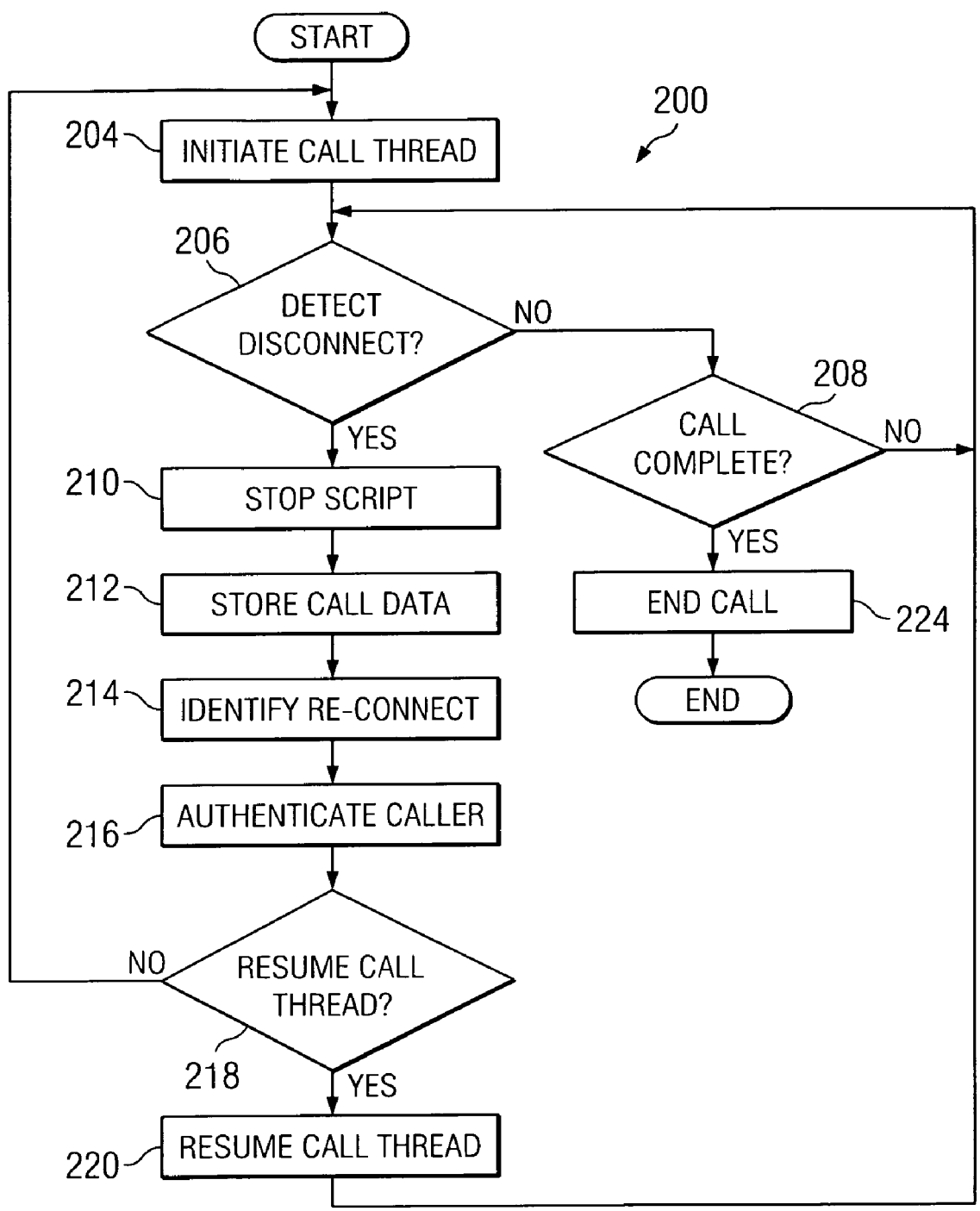

METHOD AND SYSTEM OF AUTOMATICALLY PAUSING AN AUTOMATED VOICE SESSION

CROSS-REFERENCE TO RELATED APPLICATIONS

This application is a continuation-in-part of U.S. Ser. No. 11/013,222 filed Dec. 14, 2004, now U.S. Pat. No. 7,471,774, entitled "Method and System of Pausing an IVR System," which is incorporated herein by reference for all purposes.

TECHNICAL FIELD OF THE INVENTION

This invention relates in general to the field of telecommunications, and more particularly to a method and system of automatically pausing an automated voice session.

BACKGROUND OF THE INVENTION

An increasing number of telephone callers communicate with automated voice systems. As used herein, automated voice systems refers to voicemail systems as well as interactive voice response systems. A voicemail system allows a user to access saved voice messages, and often involves the user responding to a series of verbal prompts by pressing a key on an associated telephone. An interactive voice response system provides automated responses to a caller's requests. The caller inputs information using spoken words, tones generated by a telephone, or other methods. In response, the interactive voice response system communicates information through, for example, pre-recorded or synthesized messages.

A problem with traditional voicemail systems and interactive voice response systems is that if a user is disconnected or otherwise interrupted, the user may have to call back into the automated voice system and repeat already performed steps followed during the original session to resume processing where the disconnection occurred.

SUMMARY OF THE INVENTION

A method for providing communication with an automated voice system includes establishing a first communication session between a caller and the automated voice system. The first communication session includes a call thread. The method also includes receiving a signal indicative of a call event. In response to receiving the signal indicative of the call event, a state of the call thread is saved. The method also includes establishing a second communication session between the caller and the automated voice system at a state of the call thread associated with the saved state of the call thread.

Technical advantages of certain embodiments of the present invention include the ability to resume a call thread with an automated voice system, such as an IVR or voicemail system, at a point in the thread where a call was interrupted. This allows a user to avoid having to repeat listening to portions of voicemails previously listened to as well as traversing portions of menus already traversed. Thus, certain embodiments result in a time savings to users.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates a method of handling a call to a voicemail system when the call to the voicemail system is interrupted, in accordance with a particular embodiment of the present invention.

DETAILED DESCRIPTION OF EXAMPLE EMBODIMENTS OF THE INVENTION

Figure 1:
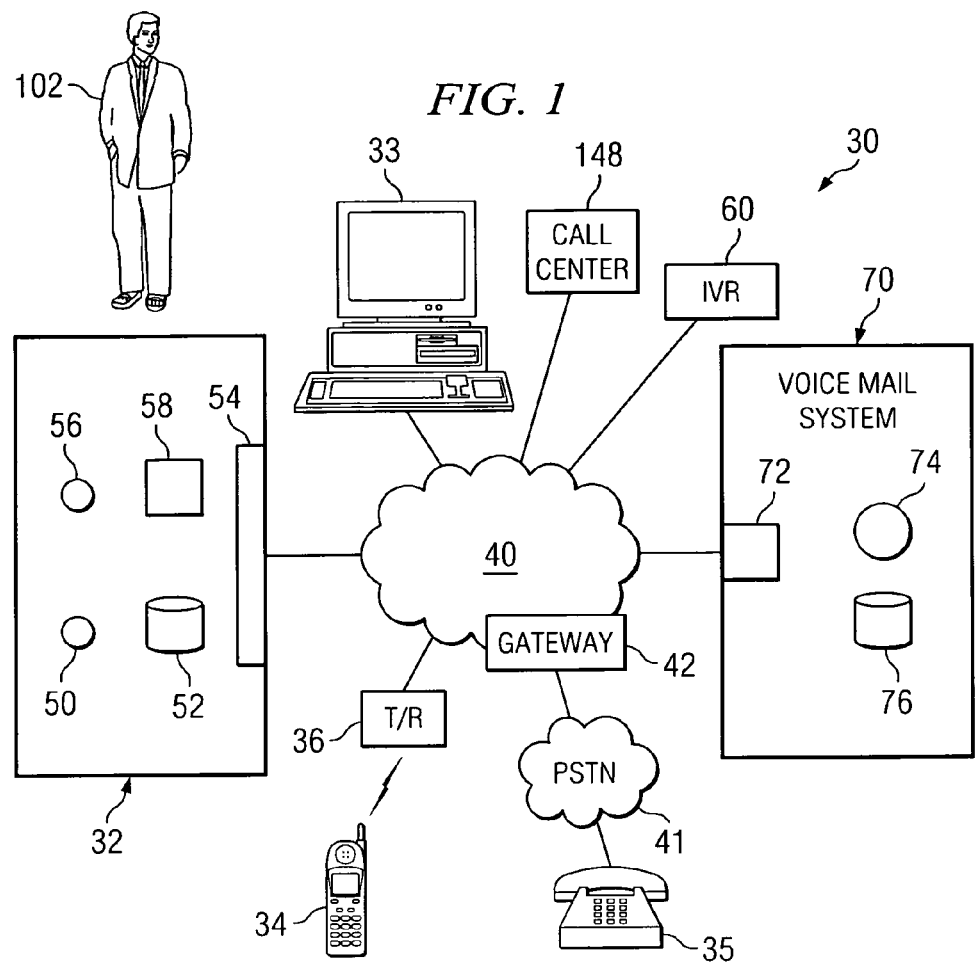
FIG. 1 illustrates a communication system with a plurality of endpoints, a voicemail system, and an interactive voice response system in accordance with a particular embodiment of the present invention.
Figure 2:
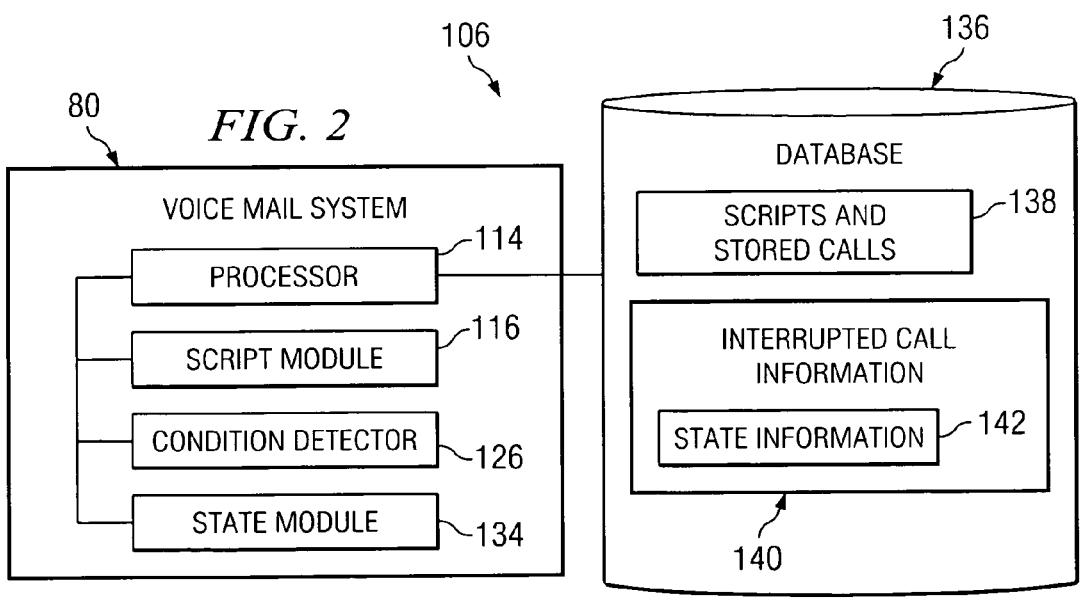
FIG. 2 illustrates the voicemail system of FIG. 1, in accordance with a particular embodiment of the present invention.

Embodiments of the present invention and its advantages are best understood by referring to FIGS. 1 through 3 of the drawings, like numerals being used for like and corresponding parts of the various drawings.

FIG. 1 illustrates a communication system 30 including a plurality of endpoints 32-35 having the ability to establish communication sessions with each other, a voicemail system 70, and an interactive voice response (IVR) system 60. Such communication sessions may be established using communication networks 40, 41 and/or additional endpoints, components or resources coupled with communication networks 40 or 41. Voicemail system 70 may allow a user to listen to or respond to voice messages, which may include providing a series of verbal prompts to a user that may be responded to by, for example, pressing keys on a telephone, or through other suitable techniques. IVR system 60 may provide answers to caller questions or may transfer callers to a call center 148 when unable to answer. IVR system 60 may provide a caller, such as caller 102 using endpoint 32, with a list of menu options and, based on the caller's responses to the menu options, direct the caller to another menu, request further information from the caller, provide information to the caller, or transfer the caller to an appropriate automated service or human representative.

In accordance with particular embodiments, systems and methods are provided that allow an automated voice system, such as voicemail system 70 or IVR system 60, to automatically pause a call thread of a session and save the state of the call thread upon detecting a signal indicative of a call event indicating a pause may be appropriate. Such call events include disconnection and placing a call on hold, for example. A session, for example, a voice session, is the active communication connection between voicemail system 70 or IVR system 60 and an endpoint 32-35. The call event signal received by voicemail system 70 or IVR system 60 may include, for example, detecting that caller 102 has placed the automated voice system on hold, detecting that caller 102 has been disconnected from the automated voice system, or detecting that caller 102 has been nonresponsive to one or more prompts issued from the automated voice system, or other events that would interrupt a caller's interaction with the automated voice system. In response, voicemail system 70 or IVR system 60 may pause an ongoing session with caller 102 and save the call information so the call may be continued at a later time. Particular embodiments allow users to resume their call thread at the same position in the call that the call thread was paused.

Endpoints 32-35 may be any combination of hardware, software and/or encoded logic that provide communication services to a user. For example, endpoints 32-35 may include a telephone, a mobile phone, an IP phone, a computer running telephony software, a video monitor, a camera or any other communication hardware, software and/or encoded logic that supports the communication of media using communication network 40. In the illustrated embodiment, endpoints 32-34 include an internet telephone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and type of endpoints 32-35 capable of communicating with voicemail system 70 or IVR system 60.

In the illustrated embodiment, endpoint 32 includes processor 50, memory 52, network interface 54, codec 56, and user interface 58. User interface 58 may include a microphone, video camera, speaker, keyboard, video display, LCD display and/or other device. In accordance with another embodiment, user interface 58 may be coupled with components that include a microphone, video camera, speaker, keyboard, video display and/or other device, rather than having those components incorporated into endpoint 32. Caller 102 may establish a communication session with voicemail system 70 or IVR system 60, using endpoint 32. Endpoints 33-35 may include similar or identical components to endpoint 32, having similar functionality.

In the illustrated embodiment, voicemail system 70 includes network interface 72, processor 74, and memory 76. Processor 74 may be a microprocessor, controller or any other suitable computing device or resource. Memory 76 may be any form of volatile or nonvolatile memory including, without limitation, magnetic media, optical media, random access memory (RAM), read only memory (ROM), removable media or any other suitable local or remote memory component. Processor 74 uses memory 76 to create a call thread and to store call information associated with caller 102. The call thread and call information may be at least partially based on responses from caller 102 received by processor 74 through network interface 72. Voicemail system 70 receives signals over communication network 40 through network interface 72. The signals are received at processor 74, which determines the proper action to take based on the information contained in the signals, executes those actions, and outputs the correct response.

IVR system 60 may include substantially the same components as voicemail system 70 (not explicitly shown).

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35 for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 may provide for the communication of packets, cells, frames and/or other portions of information (generally referred to as packets) between and among endpoints 32-35, voicemail system 70, IVR system 60, and call center 148. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35, voicemail system 70, IVR system 60, and call center 148, coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between an endpoint 32-35 and voicemail system 70 or IVR system 60 or call center 148 may include the transfer of packets across one or more communication paths, that couple endpoints 32-35 to voicemail system 70 or IVR system 60 and/or to call center 148 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Because IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VOIP). In the illustrated embodiment, endpoints 32-34, voicemail system 70, IVR system 60, and call center 148 may be IP telephony devices. IP telephony devices have the capability of encapsulating a user's voice (or other inputs) into IP packets so that the voice can be transmitted over network 40. Similarly, IP telephony devices 32-34 may have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VOIP call control system and other signaling protocols (e.g., SS7, T1, ISDN, etc.) used in PSTN 41 and translates and/or maps between the IP network addresses and PSTN phone numbers.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

FIG. 2 illustrates a voicemail system 80, in accordance with a particular embodiment, which may be utilized rather than voicemail system 70. The teachings of the invention are described by example below with reference to automatic pausing of a call thread in voicemail system 80; however, the teachings of the invention are also applicable to such automatic pausing in an interactive voice response system, such as IVR 60. In the illustrated embodiment, voicemail system 80 includes a processor 114, a script module 116, a condition detector 126, a state module 134, and a database 136. Processor 114 may execute appropriate software (not explicitly shown) for performing its functions, or alternatively may be replaced by firmware or other suitable implementations. Database 136 includes scripts 138 and interrupted call information 140. Voicemail system 80 is operable to automatically pause a call thread of a call session upon receiving a signal indicating a call has been interrupted, such as, for example, the call being disconnected or placed on hold. The call thread for a voicemail system 80 is the path that caller 102 takes through available menu choices provided by voicemail system 80, along with information collected by voicemail system 80 from caller 102, as well as the identity and location within any message listed to or recorded. The call thread also indicates at what point caller 102 is in a menu hierarchy and indicates what the next action should be, for example, wait for a response from caller 102, play a prompt to caller 102, or recite a list of menu options to caller 102. A call thread is created when a new communication session is established between a caller and voicemail system 80. The call thread grows as the caller and voicemail system 80 negotiate through the menu hierarchy. Upon detecting another pause condition, voicemail system 80 may pause the call thread with the caller and may save the call information so the call may be continued at a later time. In addition, any data associated with the call session may be cached by the system.

A caller 102 may input information to voicemail system 80 using voice, touchtones, or other suitable signaling method, such as those associated with an endpoint used by the caller to communicate with the voicemail system. In the event the call is disconnected or placed on hold, or otherwise interrupted, this status is received by voicemail system 80 and the session is paused. Transmission to voicemail system 80 of the disconnection, hold, or otherwise interrupted status may be effected by any suitable mechanism, depending upon the environment or implementation. For example, voicemail system 80 may be configured according to the JTAPI protocol to monitor the calling endpoints (32-35). When the call is, for example, placed on hold, voicemail system 80 will receive a CallCtlTermConnHeldEvent signal indicating that the voicemail session has been placed on hold. This message can be sent by any suitable device such as by gateway 42. Alternatively, the call event could be translated into some other event before transmission. Upon receipt of the received signal indicative of a call event, voicemail system 80 pauses the call thread. A similar approach may be used for a disconnect event or other type of interruption, such as hold, call waiting, or call coming in on another extension. Other protocols may also be used to provide similar messages to, and access by, voicemail system 80 to the call control message/event channel. To resume the paused call thread with voicemail system 80, the caller may reestablish a communication session with voicemail system 80. This may be effected by releasing the call held function, by placing another call, or by other suitable techniques.

The prompts played by voicemail system 80 are determined by script module 116. The call thread may begin by voicemail system 80 playing a welcome message to caller 102. Voicemail system 80 may then request some input from caller 102 such as, for example, an identification code. The information entered by caller 102 is interpreted by processor 114, and script module 116 determines the next prompt and/or stored call to play based on this information. Processor 114 then retrieves the appropriate prompt and/or stored call from scripts and stored calls 138 in database 136. Processor 114 then converts the prompt into signals or packets that can be communicated to an endpoint used by caller 102. Prompts of scripts 138 may include, for example, requests for information from caller 102 or a list of menu options from which caller 102 may choose.

Caller 102 may communicate a response by speaking or pressing the keys corresponding to the requested information and/or menu options. In particular embodiments, this dialog between caller 102 and voicemail system 80 may continue until caller 102 has listened to all stored messages and recorded all messages desired to be sent.

During the execution of the voicemail script or playing back or recording of a message, at least one of two things may be happening: (1) the script module may be interacting with caller 102 (e.g., playing a prompt to caller 102 or collecting voice from caller 102 via speech recognition, etc.), or (2) the system may be doing some backend processing that does not involve direct interaction with caller 102 (e.g., database lookup or account number verification).

In the case that a call event occurs that effects automatic pausing of the session while the system is interacting with the caller and later decides to resume the session, the voicemail system could continue with the interaction at the point at which it left off or at some other suitable location. For example, if a call is disconnected while the system is playing a recorded message, then, when caller 102 reconnects, the system could continue playing the prompt at the point where it left off, replay the message from the beginning, or replay the message at some time interval prior to where it left off. In one example, this time interval is one to five seconds. This time interval may be set or may be defined by the user.

In the case that a call event occurs that effects automatic pausing while the system is doing something other than interacting with the caller, voicemail system 80 may continue to execute the other action and any following non-interacting actions until an interacting action should be executed. Once the flow of execution has reached a point at which an interacting action with the caller needs to be executed, the call thread may be paused. When communication with caller 102 is re-established, the call thread continues at that interacting action (or at some suitable previous time period). This could be beneficial in cases when the call disconnects while voicemail system 80 is, for example, performing a database lookup that takes an extended period of time. If this database lookup were followed by a prompt action, then voicemail system 80 may execute the database lookup action but may stop before the prompt action and wait for reconnection before continuing the call thread.

State module 134 determines the state of the call between caller 102 and voicemail system 80, playing a message to caller 102 or voicemail system 80 performing backend processing. If script module 116 is playing a message to caller 102 when a call event is received, state module 134 may instruct script module 116 to cease playing the message. If state module 134 determines that processor 114 is conducting backend processing when a call event is received, such as, for example, a database lookup, state module 134 may allow the backend processing to continue until complete. State module 134 communicates the state of the call to processor 114, when communications to caller 102 have stopped and the backend processing is completed or stopped. After receiving the state information from state module 134, processor 114 communicates the paused call information 140 and the state information 142 of the paused session to database 136 where such information is stored.

State module 134 may contain predetermined save points. The predetermined save points may be locations in the call thread at which it may be natural and intuitive to resume paused dialogue between caller 102 and voicemail system 80. Alternatively, the thread may be resumed at any suitable location associated with the point at which the call was interrupted. Such locations may include the location where the call was interrupted or a particular time period, preset or user-specified, before or after the location at which the thread was interrupted. When caller 102 reconnects, the caller's session may continue at the most recent save point. This gives caller 102 the advantage of continuing the call session at a more natural, intuitive location in the thread. An example save point may occur prior to requesting caller 102 to enter a lengthy account number. A save point prior to such an account number entry would enable caller 102 to resume entry the account number from the beginning of the number rather than attempting to resume in the middle of entering the account number. A save point may also occur prior to a prompt requesting entry of the account number. As another example, logical save points may occur after caller 102 has responded to any prompt from voicemail system 80.

When caller 102 reconnects with voicemail system 80, voicemail system may identify caller 102 by any suitable technique. For example, caller 102 may be identified by the called number, the calling number, or by entry of an account number. Upon identification of caller 102, voicemail system 80 may query caller 102 whether he wishes to resume the previous thread that was interrupted. This query may also include options related to the location in the thread that it will be resumed. According to one aspect of the invention, the interrupted thread and the associated state upon interruption is stored only for a particular time period and/or the user is only prompted to resume the previously interrupted thread upon reconnection only for that time period. This time period may be designated or user-defined. In one example, this time period is 15 minutes. Thus, in that example after 15 minutes from interruption, a user will no longer be prompted to continue the previous thread upon reconnection. If the caller 102 indicates a desire not to resume the previous call thread, then a new call thread may be initiated. Processor 114 may recognize caller 102 by authenticating caller 102. Authentication could occur by any suitable method, including, for example, verifying a cookie deposited at an endpoint associated with caller 102, receiving an identification password from caller 102, or identifying the phone number of an endpoint associated with caller 102 by phone number detection.

Upon caller 102 selecting to resume the thread, processor 114 retrieves the paused call information 140 and state information 142 from database 136. State module 134 determines the state at which the call was paused and communicates the state information to processor 114 and script module 116. Script module 116 then resumes the call thread where it left off, or at other suitable location, as described above. The call may then continue.

It will be recognized by those of ordinary skill in the art that voicemail systems in accordance with particular embodiments may include any number of processors or memory or other modules to accomplish the functionality and features described herein. The use of script module 116 and state module 134 to illustrate pausing a call thread for later resumption and other features is for example purposes only, and the ability to pause and resume a call session and perform other features may be implemented using any suitable type of communication hardware, software and/or encoded logic. In addition, any processors, memory, or other modules used, such as processor 114, script module 116, state module 134, and database 136, may be centrally located (local) with respect to one another or distributed throughout a communication network or system.

FIG. 3 is a flowchart 200 illustrating, in accordance with a particular embodiment, a method of processing an automatic pause of a call thread. The particular example described is with respect to disconnection and reconnection of a caller. Other suitable call events causing automatic pausing, such as a call hold event may utilize analogous processing. The method begins with processor 114 and script module 116 initiating the call thread at step 204. The dialog between caller 102 and voicemail system 80 may continue until caller 102 is disconnected from voicemail system 80.

At step 206, condition detector 126 determines whether the call has been disconnected (or otherwise interrupted, such as being placed on hold) by receipt of a call disconnect signal (or other suitable signal). If the call is still connected (and otherwise uninterrupted), processor 114 checks to see if the call is complete at step 208. If the call is complete, the call is ended at step 224. If the call is not complete, the method returns to step 206.

If condition detector 126 determines at step 206 that caller 102 has become disconnected from voicemail system 80, condition detector 126 informs processor 114 of this condition, and processor 114 instructs script module 116 to stop the script at step 210. This disconnection may occur, for example, when a user is in the middle of listening to a very long voicemail message, for example three minutes into a seven minute message. The disconnection could have occurred because the user received a call from an important caller, such as a company CEO, which requires that the user take the call from the important caller and disconnect. The user could disconnect either by hanging up or by pressing the answer call button, which may result in placing the current voicemail session on hold. In response to receiving a signal, for example from a PBX, that the voicemail call has been placed on hold, state module 134 will report the state of the call to processor 114, and processor 114 will store the interrupted call information 140 and state information 142 in database 136 at step 212. The state of the call may be the state at the point in time of receipt of the on-hold message, or may be some associated state, such as a few seconds before or the beginning of the most current sentence.

When caller 102 calls back into voicemail system 80, processor 114 identifies caller 102 as a reconnection of a previously interrupted call at step 214. This could occur in the above example by the caller completing the call with the company CEO and de-selecting the hold feature associated with the voicemail call. Caller 102 is authenticated at step 216, and a determination of whether or not to resume the call thread of the previous call is made at step 218. In some embodiments, the identification of the caller as a reconnection of a previously disconnected call may be made when the caller is authenticated. In particular embodiments, caller 102 makes the determination whether to resume the previous call thread or to initiate a new call thread. If caller 102 decides to initiate a new call thread, the method returns to step 204. If caller 102 desires to continue the previous call thread, the call thread is resumed at step 220, at which point the process may continue as described above. At step 222, processor 114 checks to see if the call is complete. If the call is not complete, the dialog between caller 102 and voicemail system 80 continues until the call is complete or until another disconnection is detected. In one embodiment, multiple disconnections of caller 102 from voicemail system 80 may be detected, the call information may be saved, and the call thread from previous calls may be resumed. In another embodiment, only one disconnection and resumption of a call may be allowed. When the call is complete it is ended at step 224.

Some of the steps illustrated in FIG. 3 may be combined, modified or deleted where appropriate, and additional steps may also be added to the flowchart. Additionally, steps may be performed in any suitable order without departing from the scope of the invention.

Several other example cases are described below. In one example a user is connected to an IVR or voicemail system and receives a second call on the same line (but with call waiting enabled). When the user answers the call, the IVR detects that the audio stream between itself and the other end has stopped. This results in pausing the IVR session and saving the current state. Thus, the user will be able to return to the IVR thread where he left off. For example, if the user has traversed a series of menu options requiring length responses, the user may avoid re-traversing those same steps again and simply start where he left off. In another example, a user could receive a call on a second line while engaging in an IVR or voicemail session on the first line. The resulting procedure is analogous to that described above.

In a third example, a user connected to an IVR or voicemail system is disconnected for some reason. The automated voice system receives a signal indicating disconnection and reacts by pausing the session and saving the state of the thread. Upon calling back in the user is identified by the system, such as by user ID, ANI, and IVR application level authentication. The system then restores the state and resumes the thread where it left off. The system could set a time period during which the user must call in to be able to resume the state, such as, for example, 15 minutes. In another embodiment, the system could give the user the option of continuing from where he left off or starting from the beginning with no saved state.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and voicemail system 80, these elements may be combined, rearranged, or positioned in order to accommodate particular architectures or needs. The present invention contemplates great flexibility in the arrangement of elements as well as their interrelations.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for providing communication with a voicemail system comprising:
    establishing a first communication session between a caller and a voicemail system, the first communication session comprising a call thread;
    receiving a signal indicative of a call event selected from the group consisting of an on-hold event and a disconnect event;
    in response to receiving the signal indicative of the call event, saving a state of the call thread;
    identifying the caller calling into the voicemail system by an identifier selected from the group consisting of an account number entered by the caller, a calling number of the caller, and a called number of the caller;
    in response to identifying the caller, querying the caller regarding whether the caller wishes to resume the call thread of the first communications session, but only if the caller calls into the voicemail system within 15 minutes of receipt of the signal indicative of the call event; and
    establishing a second communication session between the caller and the automated voice response system at a state of the call thread associated with the saved state of the call thread, the state of the call thread associated with the saved state of the call thread selected from the group consisting of the saved state of the called thread and 1-5 seconds before the saved state of the called thread.

2. A method for providing communication with an automated voice response system, comprising:

establishing a first communication session between a caller and an automated voice system, the first communication session comprising a call thread;

receiving a signal indicative of a call event;

in response to receiving the signal indicative of the call event, saving a state of the call thread; and establishing a second communication session between the caller and the automated voice system at a state of the call thread associated with the saved state of the call thread only if the caller calls into the automated voice response system within a predetermined time period.

3. A method for providing communication with an automated voice response system, comprising:

establishing a first communication session between a caller and an automated voice system, the first communication session comprising a call thread;

receiving a signal indicative of a call event;

in response to receiving the signal indicative of the call event, saving a state of the call thread; and establishing a second communication session between the caller and the automated voice system at a state of the call thread associated with the saved state of the call thread;

wherein establishing a first communication session between a caller and an automated voice system comprises establishing a first communication system between a caller and an automated voice system selected from the group consisting of a voicemail system and an interactive voice response system without voicemail capability;

wherein receiving a signal indicative of a call event comprises receiving a signal indicative of a call event selected from the group consisting of an on-hold event and a disconnect event;

wherein the state of the call thread associated with the saved state of the call thread is selected from the group consisting of the saved state of the called thread and 1-5 seconds before the saved state of the called thread;

wherein establishing a second communication session between the caller and the automated voice system at a state of the call thread associated with the saved state of the call thread comprising:

wherein establishing a second communication session between the caller and the automated voice system at a state of the call thread associated with the saved state of the call thread only if the caller calls into the automated voice response system within 15 minutes of receiving the call event; and further comprising identifying the caller upon the caller calling into the automated voice response system by an identifier selected from the group consisting of an account number entered by the caller, a calling number of the caller, and a called number of the caller.

4. The method of claim 2, wherein establishing a first communication session between a caller and an automated voice system comprises establishing a first communication system between a caller and an automated voice system selected from the group consisting of a voicemail system and an interactive voice response system without voicemail capability.

5. The method of claim 2, wherein receiving a signal indicative of a call event comprises receiving a signal indicative of a call event selected from the group consisting of an on-hold event and a disconnect event.

6. The method of claim 2, wherein establishing a second communication session between the caller and the automated voice system at a state of the call thread associated with the saved state of the call thread comprises identifying the caller upon the caller calling into the automated voice response system.

7. The method of claim 6, wherein identifying the caller upon the caller calling into the automated voice system comprises identifying the caller by an identifier selected from the group consisting of an account number entered by the caller, a calling number of the caller, and a called number of the caller.

8. The method of claim 2, wherein the predetermined time period is approximately 15 minutes.

9. The method of claim 2, wherein the state of the call thread associated with the saved state of the call thread is selected from the group consisting of the saved state of the called thread and a predetermined time period before the saved state of the called thread.

10. The method of claim 9, wherein the predetermined time period is 1-5 seconds.

11. The method of claim 2, wherein establishing a second communication session between the caller and the automated voice system at a state of the call thread associated with the saved state of the call thread comprises querying the caller regarding whether the caller wishes to resume the call thread at a state associated with the saved state of the call thread.

12. An automated voice system comprising:

a processor; and software encoded on computer-readable media that is operable when executed on the processor to:

establish a first communication session between a caller and an automated voice system, the first communication session comprising a call thread;

receive a signal indicative of a call event;

in response to receiving the signal indicative of the call event, saving a state of the call thread; and establish a second communication session between the caller and the automated voice system at a state of the call thread associated with the saved state of the call thread only if the caller calls into the automated voice system within a predetermined time period.

13. The automatic voice system of claim 12, wherein the software is further operable to:

establish a first communication session between a caller and an automated voice response system by establishing a first communication system between a caller and an automated voice response system selected from the group consisting of a voicemail system and an interactive voice response system without voicemail capability;

receive a signal indicative of a call event by receiving a signal indicative of a call event selected from the group consisting of an on-hold event and a disconnect event;

identify the caller upon the caller calling into the automated voice response system by an identifier selected from the group consisting of an account number entered by the caller, a calling number of the caller, and a called number of the caller.

14. The automatic voice system of claim 12, wherein the software is further operable to establish a first communication session between a caller and an automated voice system by establishing a first communication system between a caller and an automated voice system selected from the group consisting of a voicemail system and an interactive voice response system without voicemail capability.

15. The automatic voice system of claim 12, wherein the software is further operable to receive a signal indicative of a call event by receiving a signal indicative of a call event selected from the group consisting of an on-hold event and a disconnect event.

16. The automatic voice system of claim 12, wherein the software is further operable to establish a second communication session between the caller and the automated voice system at a state of the call thread associated with the saved state of the call thread by identifying the caller upon the caller calling into the automated voice system.

17. The automatic voice system of claim 16, wherein the software is further operable to identify the caller upon the caller calling into the automated voice system by an identifier selected from the group consisting of an account number entered by the caller, a calling number of the caller, and a called number of the caller.

18. The automatic voice system of claim 12, wherein the predetermined time period is approximately 15 minutes.

19. The automatic voice system of claim 12, wherein the state of the call thread associated with the saved state of the call thread is selected from the group consisting of the saved state of the called thread and a predetermined time period before the saved state of the called thread.

20. The automatic voice system of claim 19, wherein the predetermined time period is 1-5 seconds.

21. The automatic voice system of claim 12, wherein the software is further operable to query the caller regarding whether the caller wishes to resume the call thread at a state associated with the saved state of the call thread.

22. An automated voice system comprising:
means for establishing a first communication session between a caller and the automated voice system, the first communication session comprising a call thread;
means for receiving a signal indicative of a call event;
means for saving a state of the call thread in response to receiving the signal indicative of the call event; and
means for establishing a second communication session between the caller and the automated voice system at a state of the call thread associated with the saved state of the call thread only if the caller calls into the automated voice system within a predetermined time period.

23. The automated voice system of claim 22, wherein the means for establishing a first communication session between a caller and an automated voice system comprises means for establishing a first communication system between a caller and an automated voice system selected from the group consisting of a voicemail system and an interactive voice system without voicemail capability.

24. The automated voice system of claim 22, wherein the means for receiving a signal indicative of a call event comprises means for receiving a signal indicative of a call event selected from the group consisting of an on-hold event and a disconnect event.

25. The automated voice system of claim 22, wherein the means for establishing a second communication session between the caller and the automated voice system at a state of the call thread associated with the saved state of the call thread comprises means for identifying the caller upon the caller calling into the automated voice system.

26. The automated voice system of claim 25, wherein the means for identifying the caller upon the caller calling into the automated voice system comprises means for identifying the caller by an identifier selected from the group consisting of an account number entered by the caller, a calling number of the caller, and a called number of the caller.

27. The automated voice system of claim 22, wherein the predetermined time period is approximately 15 minutes.

28. The automated voice system of claim 22, wherein the state of the call thread associated with the saved state of the call thread is selected from the group consisting of the saved state of the called thread and a predetermined time period before the saved state of the called thread.

29. The automated voice system of claim 28, wherein the predetermined time period is 1-5 seconds.

* * * * *